Patented Apr. 23, 1940

2,198,199

UNITED STATES PATENT OFFICE 2,198,199

STABILIZING FOOD COMPOSITIONS

Sidney Musher, New York, N. Y., assignor to Musher Foundation Incorporated, New York, N. Y., a corporation of New York No Drawing. Application August 30, 1939,
Serial No. 292,612

3 Claims. (Cl. 99—163)

The present invention relates to the preparation of a new sugar and sugars which possess marked stabilizing and antioxygenic properties.

It is the purpose of the present invention to provide new modified sugars possessing marked stabilizing and antioxygenic properties which may be widely used to overcome oxidative deterioration of organic materials and particularly in oxidizable food compositions.

A further object is the retardation of oxidative deterioration by simple and economical means through the use of these modified sugars either by additive products or in partial or complete replacement for ordinary sugars normally used.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is preferably used the substantially crude unrefined or raw sugar as obtained from the cane and beet, and less preferably the substantially refined sugars as obtained principally from cane, beet or corn, and desirably in crystallized form or in form capable of crystallization.

Where the sugar to be used in this preparation is a crude or raw sugar and where the modified sugar is to be used for food products, such sugar should desirably be washed and filtered by adding water thereto and subjected to a filtration process to remove dirt and other extraneous and objectionable matter.

Crystallized and uncrystallized residues from the washings including the mother liquors may also be used, although it is generally desirable to utilize the crystallized washed material as against the residues.

In accomplishing the above objects, the sugars are prepared with a minor amount of the alcohol soluble extract of unbleached cereals and grains, which include corn or maize, barley, oats and hominy, and less preferably tapioca, rye, rice, wheat and buckwheat.

The preferred cereals are those which contain less than 0.75% total phosphorus and less than 10% of glyceride content and they are preferably in a fine state of division. The oat and maize cereals, preferably in raw and unbleached condition, and dry milled and finely divided, give the highest yield of stabilizing activity as against the other cereals when utilized with the sugars.

In accordance with this invention, an alcohol soluble extract of the cereal is taken and that alcohol soluble extract is combined with the sugar. In the preparation of the alcohol soluble extract, the cereal, such as maize flour or hominy, is submerged in from 5 to 10 parts or more of alcohol and desirably at a slightly elevated temperature as at 100° F. to 110° F. and subjected to thorough agitation in the alcohol.

The starchy and fibrous residual portion is then removed by filtration, centrifuging, siphoning or other process following a short extraction period of from a few seconds to several hours or longer.

Where the alcohol or similar solvent employed to remove the alcohol soluble fraction is kept at higher than room temperature, the extract will more readily be removed.

It is particularly desirable for the alcohol to be acidified to a pH of between 4.0 and 6.8 and preferably to a pH of between 5.5 and 6.0 before subjecting the cereal to extraction. By the use of an acidified alcohol, not only will the extract be more readily obtained, but there is produced a much more desirable extract from the standpoint of antioxygenic and other properties.

Mixtures of alcohol and water may also be employed for purposes of this invention and are included in the solvents to be utilized for producing the alcohol soluble solvents. For example, mixtures of 80% alcohol and 20% water may be employed as well as mixtures comprising 20% alcohol and 80% water.

Among the alcohols that are included for use in accordance with this invention are any of the common alcohols such as methyl, ethyl, propyl, butyl, etc., and other alcohols having the formula XOH where X is a low molecular weight aliphatic group. There may less preferably be utilized the glycols and glycol ethers and similar solvents to produce the alcohol soluble extract.

After the undissolved cereal fibres have been removed, the solvent is evaporated off, desirably under reduced pressure, until substantially all of the solvent has been removed.

The ethyl alcoholic extract of maize flour, for example, acidified to a pH of 6.0 by the use of $H_2SO_4$ may be added to clarified cane sugar after the sugar has been crystallized out, but before it has been subjected to its final drying operation. The alcoholic extract should then be thoroughly admixed in the sugar, preferably subjecting the sugar to a milling, rolling or pressing operation in order to obtain a thorough admixture of the two products, and the sugar containing the extract may then be dried by blowing hot air over the surface of the modified sugar or by drying under reduced pressure.

The alcohol soluble extract may also be subjected to a complete drying operation before mixture with the sugar, or the dried extract may be added to the sugar syrup and thoroughly admixed therewith.

The amount of sugar and cereal extract to be used will vary within fairly wide limits, such as, for example, from about 0.02% of the cereal extract and 99.98% of the sugar on their solids weight basis, to about 50% of the cereal extract and 50% of sugar. The amount of cereal extract and sugar to be used will depend largely upon the degree of stabilizing activity desired and also upon whether or not a uniform crystalline structure is desired in the preparation of the sugar and dependent upon the use to which the sugar is going to be put.

A minor proportion of the cereal extract is preferred against the weight of the sugar and preferably less than 5% of the cereal extract is used with 95% of the sugar, on their solids weight basis. For example, it has been found that less than 3% of the cereal extract and 97% of sugar will give a satisfactory crystalline product which can be readily applied to many organic products that are subject to oxidative deterioration.

On the other hand, satisfactory combinations may be prepared using, for example, 60% of sugar with 40% of the cereal extract and although this product does not possess the same crystalline structure as the aforementioned product, nevertheless it possesses marked stabilizing and antioxygenic properties when used with organic materials.

Sugar as prepared in this manner will be markedly antioxygenic in character as compared with ordinary sugar or even as compared with the cereal extracts themselves. Ordinary refined sugars, insofar as most organic products are concerned, possess no antioxygenic properties. The crude unrefined sugars do possess antioxygenic properties, but when utilizing the cereal extract-sugar combination or complexes there is obtained a marked enhancement in stabilizing activity which cannot be expected from the stabilizing activity of any of the individual component parts of these complexes, such as, for example, might be assumed from the stabilizing activity of the carbohydrates contained in the sugars or in the alcohol soluble extract, or from any of the other individual fractions in the resulting complex.

It is not known whether an actual chemical combination takes place or whether it is merely an adsorptive phenomenon which occurs at the surface of the sugar crystals or in the sugar molecule or whether there is an interaction of a catalytic nature and which results in marked enhancement of stabilizing and antioxygenic activity.

Although it is particularly desirable to utilize the substantially crude unrefined sugars either in crystalline or uncrystallized form, and as obtained from cane and beets, the refined sugars may also be prepared with the alcohol soluble extracts of the cereals and grains in order to give marked antioxidant and stabilizing activity.

For example, the refined sugars would include those sugars which have been subjected to refining operations such as to bone char filtration, and including ordinary refined cane sugar, refined beet sugar, refined corn sugar or dextrose, etc. There would also be included the substantially purified sugars including pure sucrose, dextrose, fructose, galactose, invert sugar, maltose, lactose, mannose, arabinose, and less preferably other commonly available water soluble mono, di, and poly-saccharides or carbohydrates. These would also include the various refined sugars, whether brown sugar or perfectly white.

These modified sugars may be utilized in the stabilization of many kinds of organic materials, particularly aqueous, fat and essential oil-containing compositions, such as dairy products, including milk, cream, ice cream, condensed and evaporated milk, cream cheese, etc., confections and candies including toffees, caramels, nougats, milk chocolate, lime, lemon or orange drops, butter creams, fruit juices, jams and jellies, marmalade, coffee, dessert powders, canned fruits, beverages such as orange drink, lemon drink, raspberry syrup, etc., pickle baths for curing meats, such as bacon, hams, etc., for curing fish, fruits, vegetables, etc., and each and all of these products will be materially stabilized against oxidative deterioration.

The modified sugars may be employed in any desired percentage, but generally they are used in amounts that vary from 0.1% to 20%. A great deal will depend upon the concentration of sweetness desired in the finished product in the event that it is an edible product, or the degree of protection that is desired in the event that it is an inedible product. Of course, in the case of special products such as in the case of dessert powders, the amount of sugar to be used will be far in excess of 20%.

As an example of the use of such a modified sugar for stabilizing food compositions, strawberry ice cream was prepared with 15% of refined cane sugar to which sugar had been added 1% of the ethyl alcoholic extract of unbleached maize flour prepared by soaking 1 part of the maize flour in 5 parts of ethyl alcohol at 100° F., agitating for 15 minutes, filtering off the alcohol soluble portion and evaporating off the alcohol under reduced pressure.

The strawberry ice cream thus prepared was compared with strawberry ice cream prepared with 15% of untreated refined cane sugar by tasting at regular intervals after storage at 15° F., the number of + signs indicating the increase in off-flavor or oxidized flavor development.

| | Degree of oxidized flavor after— | | |
|---|---|---|---|
| | 2 weeks | 4 weeks | 6 weeks |
| Ice cream with treated sugar | — | ± | + |
| Ice cream with untreated sugar | ± | ++ | +++ |

These modified sugars whether crude or refined show particularly marked antioxygenic and stabilizing activity when subjected to elevated temperatures in the presence of the oxidizable material. For example, where the modified sugar is heated to in excess of 145° F. and preferably about 250° F. in the presence of the material subject to oxidation, a marked enhancement in antioxidant and stabilizing activity is obtained. A heat treatment of as high as 400° F. to 500° F. will give still further stabilizing action or as little as 145° F. will materially improve the antioxidant activity of the modified sugar. It is not definitely known why the marked enhancement in stabilizing activity is obtained when the sugar complexes or modified sugars are heated in the presence of the oxidizable material but it is believed that some chemical action occurs when using the sugar-cereal extract combination.

Less preferably, the complexes of the present invention may also be applied to the stabilization of non-aqueous materials such as the essential oils, glyceride oils and the hydrocarbon oils.

For example, 2% of a modified sugar composed of 80% of crude cane sugar and 20% of the ethyl alcohol extract of pulverized oats may be added to cod liver oil and the cod liver oil may preferably be subjected to an elevated temperature treatment of about 300° F. to 400° F. for 0 to 5 minutes.

With white mineral oil, there may be used 0.5% of a modified sugar containing 75% of refined cane sugar and 25% of a concentrated acidified ethyl alcoholic extract of pulverized whole oats. A heat treatment to 300° F. for 5 minutes may be utilized to obtain enhancement of the antioxygenic effect.

This application is a continuation in part of application Serial No. 241,641, filed November 21, 1938, which has matured into Patent No. 2,176,034, and through said last mentioned application of the earlier application Serial No. 14,701, filed April 4, 1935.

Having described my invention, what I claim is:

1. A process of stabilizing a glyceride oil containing food composition subject to oxidative deterioration which comprises extracting a finely divided unbleached cereal with alcohol, drying and combining said extract with a sugar, adding a relatively small proportion of said dried combination to the food composition, and then heating to at least 145° F., whereby the food composition is stabilized against oxidative deterioration.

2. A process of stabilizing a food composition subject to oxidative deterioration which comprises extracting finely divided unbleached cereals with a slightly acidified alcohol-water mixture, combining and concentrating said extract with a sugar, adding a relatively small proportion of said combination to the food composition, and then heating to at least 250° F., whereby the food composition is stabilized against oxidative deterioration.

3. A process of stabilizing an organic composition subject to oxidative deterioration which comprises extracting finely divided unbleached cereals with alcohol, combining and concentrating said extract with a sugar, adding a relatively small proportion of said combination to the organic composition, and then heating to at least 145° F., whereby the organic composition is stabilized against oxidative deterioration.

SIDNEY MUSHER.